Dec. 9, 1969  K. FROHMÜLLER ET AL  3,483,408
INSULATING ARRANGEMENT FOR ELECTRICAL MACHINES
Filed Nov. 1, 1967

Inventors:
Klaus Frohmüller
Hans-Joachim Schenker
BY  Spencer & Kaye
Attorneys

United States Patent Office 3,483,408
Patented Dec. 9, 1969

3,483,408
INSULATING ARRANGEMENT FOR ELECTRICAL MACHINES
Klaus Frohmüller, Oldenburg, and Hans-Joachim Schenker, Sandkrug, Germany, assignors to Licentia Patent-Verwaltungs-G.m.b.H., Frankfurt am Main, Germany
Filed Nov. 1, 1967, Ser. No. 679,790
Claims priority, application Germany, Nov. 2, 1966, L 54,960
Int. Cl. H02k 11/00, 9/00
U.S. Cl. 310—71                    8 Claims

ABSTRACT OF THE DISCLOSURE

An electrical machine, such as a motor, having a first insulator arranged between the top of the stator winding head and the bearing plate and/or a second insulator arranged between the stator laminations and the bearing plate to one side of the winding head. The first insulator acts as an air duct to control the flow of cooling air entering the machine. The second insulator acts as a terminal strip for shielding and housing the connection between the ends of the winding wires and the machine power leads.

The bearing plate is maintained a prescribed distance away from the stator laminations by means of spacers. An insulating end plate is also provided to cover the face of the stator laminations and to surround and insulate the spacers.

BACKGROUND OF THE INVENTION

The present invention relates to an arrangement providing insulation in the winding head or coil end space of low power electrical machinery, e.g., motors of the type used in office equipment.

It is desirable that office equipment motors be small in size yet provide relatively high mechanical power. In spite of their compact construction, however, these motors must satisfy safety regulations concerning motor insulation, in particular, concerning the insulation of the stator coil ends. It was common practice in the past to insulate the stator coil ends from the neighboring metal components of the motor, e.g., the bearing bracket, by leaving a corresponding space or air gap within the motor. With the desire to construct this type of motor smaller and smaller in size came the necessity, however, of reducing this spacing as well. Such a reduction is not completely compatible with the respective safety regulations and the cooling requirements of the motor.

SUMMARY OF THE INVENTION

An object of the present invention, therefore, is to provide an arrangement for insulating coil ends of electrical machinery from their neighboring metal components which complies with safety regulations and provides adequate cooling, yet permits reduction in size of the electrical machinery.

This and other objects which will become apparent in the discussion that follows are achieved, according to the present invention, by arranging members made of insulating material between the stator coil end and the neighboring metal components of a machine which, partly as a result of their profile, provide a duct for the flow of cooling air into the machine.

The arrangement according to the present invention permits the distance between the stator coil end and the surrounding metal components to be considerably reduced. As a result the electrical machine, for example, the motor, can be reduced in its dimensions, without a reduction in power.

In accordance with a further advantageous embodiment of the present invention, a formed part made of insulating material and serving as a terminal strip is arranged next to the end plate covering the bundle of stator laminations. This formed part has recesses for mounting both the ends of the electrical winding as well as the power leads connected to these winding ends so as to absorb any pulling stress on either of these wires.

DESCRIPTION OF THE PREFERRED EMBODIMENTS

Figure 1:
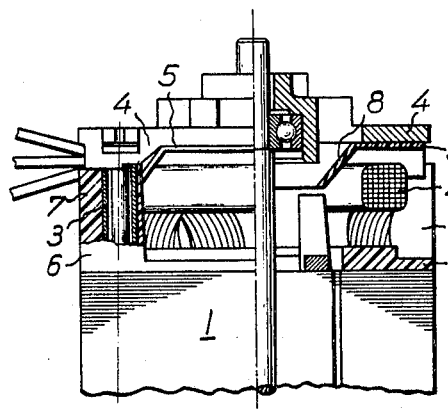
FIGURE 1 is an elevational view, partly in cross section, of the top portion of an electric motor provided with the insulating members according to the present invention.

Turning now to the drawings, FIGURE 1 illustrates one end of an electric motor which is provided with the insulating members according to the present invention. The motor includes stator laminations arranged in a bundle and containing a winding. The winding is coiled in the usual manner and forms, at the top, a winding head 2, external to the laminations. The motor further includes a bearing bracket or plate 4 mounted on a total of four spacer casings 3 which penetrate the laminations 1. An insulating member 5 is located directly against the motor or lower side of the bearing plate 4. This insulating member 5, which completely shields the bearing plate 4 from the coil head space, will be described in further detail in connection with FIGURE 2.

The stator laminations forming the bundle terminate in an end plate 6, made of die-castable insulating material. Insulating jackets 7, die-cast onto the end plate 6, completely surround and insulate from the winding head space, the length of the spacers 3 which project out of the lamination bundle.

Figure 2:
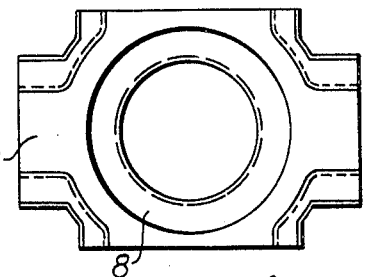
FIGURE 2 is a top view of the insulating member according to the present invention which lies with one side adjacent to the bearing plate.

FIGURE 2 shows in top view the shaped component 5 made of insulating material which sits against the bearing plate 4. This component includes a funnel-shaped duct 8 for cooling air arranged concentrically to the rotor shaft. This duct serves to guide the cooling air which is drawn from the outside into the motor by the fan blades of the rotor. The corners of the shaped components 5 are bulged toward the winding head space in order to cover and insulate the reinforced ends of the bearing plate 4, which serve to fasten the bearing plate, from the stator winding head 2.

Figure 3:
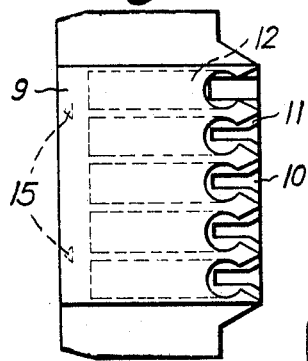
FIGURE 3 is a side view of the insulating member according to the present invention which serves as a terminal strip.
Figure 4:
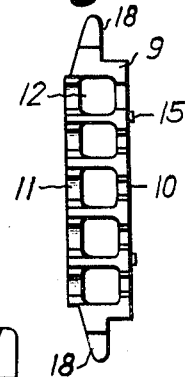
FIGURE 4 is an end view of the insulating member of FIGURE 3, depicting the member from its right side as it is shown in FIGURE 3.

FIGURES 3 and 4 illustrate the shaped component 9 in side and top views, respectively. This component 9 is made of insulating material and serves as a terminal strip for the ends of the winding as well as the power leads connected to these ends.

The edge of the terminal strip 9 which faces the bearing plate, shown as the right-hand edge in FIGURE 3, is provided with a number of cavities 12. Near the entrance of the cavities on either side of the terminal strip are slots or openings 10 and 11 which extend both into the cavities and outward to this right-hand edge. The openings 10 are smaller than the openings 11 and each serve to receive one end of the winding wires. The larger openings 11 receive the power leads in a like manner and are illustrated having a shape similar to a keyhole. These openings may incorporate spring wire gripping devices to hold the power leads in place. The cavities 12 thus form pockets which can contain the portions of the ends of the winding wires and the power leads that are connected together. The power leads are bent outward at a right angle after leaving the cavity and are mechanically fastened in the opening 11.

As a result, the wire ends are completely insulated from each other and from the winding head and are shielded from the possibility of mechanical stress arising from any pulling of the power leads. This arrangement according to the present invention has the advantage of being less expensive and requiring less space than the arrangements common in the prior art. It also makes it possible to completely fix the wire connections in place and to further improve their insulation and stress resistance merely by pouring a self-hardening casting resin into the cavity.

This shaped part or terminal strip 9 can be die-cast onto the end plate 6 and form an integral part of the two insulating jackets 7 on either side. The terminal strip 9 can also be made as a separate insertable unit of construction held in place by the insulating jackets themselves.

Figure 5:
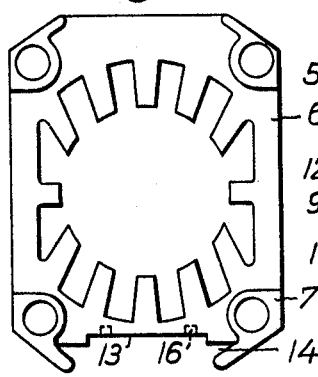
FIGURE 5 is a top view of the end plate of the stator laminations of the motor shown in FIGURE 1.

FIGURE 5 shows in top view the end plate 6 having the insulating jackets 7 mounted thereon. The insulating jackets 7 are provided with grooves 14 in which the side members 18 of the terminal strip 9, as they are shown in FIGURES 3 and 4, can be inserted. Triangular projections 15 (FIGURES 3 and 4) may also be provided on the terminal strip 9 which engage corresponding recesses 16 located in a cut-away portion 13 in the end plate 6. A terminal strip arranged in this way can thus be exchanged or replaced as desired.

Figure 6:
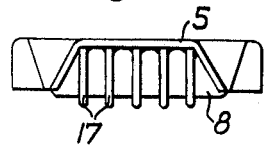
FIGURE 6 is a side view of the insulating member of FIGURE 2.
Figure 7:
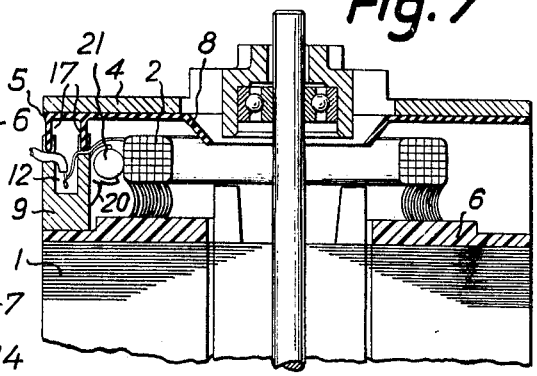
FIGURE 7 is a view taken in cross section through the middle of the motor of FIGURE 1 and illustrates the preferred embodiment of the present invention.

FIGURE 6 illustrates in side view another embodiment of the insulating shaped component 5. A number of comb-like teeth 17 are erected on one side of the shaped component in such a position that, when the motor is assembled, they will point directly into openings 10 and 11 of the terminal strip 9, as shown in FIG. 7. Any wire or lead which has been placed into these openings 10 or 11 will thus be pressed downward onto the terminal strip and held fast. This arrangement thus further shields the points of connection between the winding ends and power leads from pulling stress.

FIGURE 7 shows both the air duct 5 and the terminal strip 9 installed in the electric motor discussed in connection with FIGURE 1. The teeth 17, attached to the air duct as shown in FIGURE 6, protrude into the inner recess of the terminal strip to hold the end of the winding wire and the end of the power leads. This wire, in turn, is connected to this power lead inside the terminal strip cavity. The terminal strip 9 may also be provided with a clamp 20 made of insulating material and die-cast onto the strip for holding a thermal circuit breaker 21 inside the winding head space.

In the electric motor arrangements of the prior art, the ends of the winding wires were either soldered or welded to the connecting or power leads, insulated by means of jackets, spaghetti or the like and wrapped along with the winding wire in the winding head itself. This arrangement required time to manufacture and resulted in enlargement of the winding head and a corresponding reduction of the winding head space by more than a negligible amount.

The arrangement according to the present invention considerably reduces the manufacturing time, since it is only necessary to connect the winding wire ends with the power leads and insert them into the terminal strip 9. The elimination of the coil head wrapping required to guard against pulling stresses as well as the insulating jacket covering the points of connection save space which can be used either for a reduction in the size of the motor or for a thermal circuit breaker arranged in the winding head space.

Furthermore, as a result of the ability of the arrangement of the present invention to shield against mechanical stress, it is no longer necessary to lead the power leads through the entire winding head space. This advantage leads to a considerable saving of the power lead material when the motor is mass-produced.

As mentioned above, the arrangement according to the present invention makes it possible to mount a thermal circuit breaker next to the winding head without increasing the winding head space. This thermal circuit breaker is most practically fastened directly to the terminal strip 9 so that it will be in contact with the winding head and control its temperature. The terminal strip 9 may have die-cast thereon, for example, a claw for gripping the thermal circuit breaker so that the circuit breaker can be exchanged, if necessary, together with the terminal strip.

The main advantage of the arrangement according to the present invention is that the winding head space can be completely insulated yet reduced in its dimensions as compared to the winding head space of motors of similar power rating of the prior art. The air duct arranged on the shaped component according to the present invention that is located between the stator winding heads and the bearing plate improves the cooling of the stator winding head and therefore the efficiency of the winding.

It will be understood that the above description of the present invention is susceptible to various modifications, changes, and adaptations, and the same are intended to be comprehended within the meaning and range of equivalents of the appended claims.

What is claimed is:

1. An electrical machine comprising, in combination:
   (a) at least one metal machine casing member;
   (b) at least one stator winding having a winding head;
   (c) at least one machine power lead connected to at least one end of said winding;
   (d) means arranged between said casing member and said winding head for mechanically fastening said power lead to said machine, said means being made of insulating material;
   (e) a bundle of stator laminations;
   (f) a plurality of spacers between said bundle and said casing member; and
   (g) at least one end plate covering said bundle, said end plate being made of die-castable insulating material and having, die-cast thereto, a plurality of insulating jackets surrounding said spacers.

2. The machine defined in claim 1, further comprising a rotatable shaft and at least one bearing arranged to hold said shaft, and wherein said casing member is a bearing plate arranged to secure said bearing and said fastening means is a terminal strip connected to said end plate and includes a plurality of holes on one edge opening toward said bearing plate and a plurality of slot-like recesses on either side opening into said plurality of holes, whereby the connecting joints of said power lead and said winding end may be located in at least one of said holes, and said power lead with said winding end entering said hole through said recess.

3. The machine defined in claim 2 wherein said fastening means is die-cast onto said end plate.

4. The machine defined in claim 2, further comprising at least two insulating support means connected to said end plate, each of said support means including groove means, and wherein said fastening means is inserted between said support means held by each of said groove means and includes projections which engage corresponding slots in said end plate.

5. The machine defined in claim 4 wherein said projections are triangular in shape.

6. The machine defined in claim 2 wherein said fastening means includes spring means, in at least one of said holes, for gripping at least one of said winding ends or said power leads.

7. The machine defined in claim 2, further comprising means between said casing member and said winding head for ducting the flow of machine cooling air into said machine, said means being made of die-castable insulating material and including a plurality of teeth die-cast comblike thereon so as to point in the direction of said terminal strip.

8. The machine defined in claim 1 further comprising thermal circuit breaker means and wherein said fastening means has die-cast thereon claw means for gripping said circuit breaker means.

References Cited

UNITED STATES PATENTS 2,519,065   8/1950   Reardon _____ 310—62

FOREIGN PATENTS 1,887,798   2/1964   Germany.

OTHER REFERENCES

German printed application to Sailer, #1,002,865, 310—52.

MILTON O. HIRSHFIELD, Primary Examiner

R. SKUDY, Assistant Examiner

U.S. Cl. X.R.

310—52